United States Patent [19]

Vikio

[11] Patent Number: 5,449,437
[45] Date of Patent: Sep. 12, 1995

[54] METHOD FOR TREATING WHITE WATER USING A FIBER RECOVERY APPARATUS

[75] Inventor: Pentti Vikio, Kerimaki, Finland

[73] Assignee: A. Ahlstrom Corporation, Noormarkku, Finland

[21] Appl. No.: 254,881

[22] Filed: Jun. 6, 1994

Related U.S. Application Data

[62] Division of Ser. No. 986,050, Dec. 10, 1992.

[30] Foreign Application Priority Data

Dec. 16, 1991 [FI] Finland .................................. 915908

[51] Int. Cl.6 .............................................. D21F 1/66
[52] U.S. Cl. ...................................... 162/190; 162/189; 162/264; 210/928
[58] Field of Search ........................ 162/189, 190, 264; 210/928

[56] References Cited

U.S. PATENT DOCUMENTS 1,670,874  11/1925  Bankvs et al. .
4,405,450   9/1983  Selder .......................................... 209/3

Primary Examiner—W. Gary Jones
Assistant Examiner—Dean T. Nguyen
Attorney, Agent, or Firm—Nixon & Vanderhye

[57] ABSTRACT

White water from a paper machine is treated in an improved fiber recovery process, i.e., the "save-all" process. Prior to the mixing of sweetener stock into the white water the sweetener stock is fractionated (undiluted) into fine and coarse fiber fractions, of which only the coarse fraction is fed as sweetener stock into the white water. The inlet line for the sweetener stock is provided with a fractionation apparatus for removing the fine fraction from the sweetener stock. Treatment apparatus may also be utilized to separate the white water into fine and coarse fractions before passing the fine fraction to a mixer for mixing with the sweetener stock coarse fraction.

17 Claims, 2 Drawing Sheets

METHOD FOR TREATING WHITE WATER USING A FIBER RECOVERY APPARATUS

This is a division of application Ser. No. 07/986,050, filed Dec. 10, 1992.

BACKGROUND AND SUMMARY OF THE INVENTION

The present invention relates to a method and apparatus for treating white water of a paper machine. The invention especially relates to a fiber recovery process, in other words to the improvement of the "save-all" process.

Fiber recovery processes are used when usable fibrous material is entrained with the effluent from the fiber treatment processes, such as, for example, with white water being discharged in the web formation from the wire section of a paper machine. Usable fibrous material also separates to such filtrates which are separated from the fiber suspension by different slotted or perforated screens or by mainly liquid-permeable wires. It is characteristic of this fibrous material that the majority thereof comprising the finest fiber fraction in the fiber suspension.

The fiber recovery processes are carried out mostly by different filters, such as disc filters comprising a number of discs wire-coated on both sides and mounted on the horizontal axis, the discs being sunk into a vessel containing suspension to be treated. By subjecting the wire surfaces to a pressure difference, i.e. a reduced pressure from the inside or an overpressure from the outside, liquid is removed from the fiber suspension to the inside of the discs and further through the axis to the outside of the apparatus and a fiber matting is formed on the wire surfaces. Also drum filters are used in the fiber recovery processes, the filters being respectively formed by a wire-coated drum mounted to a horizontal axis, and the inner surface of which Wire surface is provided with so called filtrate compartments, through which liquid is discharged from the fiber suspension. The problem with the wire surface in both filter types is that it should be able to let enormous amounts of liquid through, but at the same time prevent the fine fibrous fraction from escaping to the filtrate. The best way to carry out the filtration of white water is to first form a thin layer from the "sweetener stock" (long stock), through which layer the actual white water filtration takes place.

Usually sweetener stock is added to the white water so that immediately at the beginning of the filtration a thin filtering layer of sweetener stock is formed on the wire surface. During the first seconds of the filtration most of the fine fibrous material passes with the filtrate, which is usually returned to the inlet of the filter prior to the sweetener stock accumulating and forming a sufficient layer for an effective filtration. If such a layer is not formed at all, all fines tended to be recovered might pass through the wire surface to the filtrate water. To avoid such a situation, the amount of sweetener stock that is fed usually is such that the solids ratio between sweetener stock and white water is about 0.5–1, 1–1.5, or 1.5–2.

The longer the stock of the sweetener stock is, and the less it contains fine fraction, the better it will bind the fines, in other words prevents their entrance in the filtrate water. Thus the best sweetener stock is formed by the long stock, which has a small share of short stock and fine fraction. This impermeability is, however, not the only criterium set for the quality of the sweetener stock. It is also significant how thick the fiber netting to be formed is and what kind of thickening properties it has. If the sweetener stock is optimal and the fiber netting thus of the right type, the fine material of the white water is attached thereto throughout the whole layer and not only on the surface of the sweetener stock, so that the fiber netting remains open and thus the flow channels through the fiber netting for the liquid to be filtered remain better and open longer and the capacity of the filtering apparatus is thus higher.

In all previously known save-all processes the tendency has been to affect the operation of the fiber recovery filter merely by the choice of the sweetener stock.

In accordance with a preferred embodiment of the invention, by treating the sweetener stock to be fed to the fiber recovery filter by a fractionation apparatus prior to mixing the sweetener stock to the white water in such a way that the short-fibred fine material is removed from the sweetener stock, the quality of the sweetener stock is thus improved and the efficiency of the operation of the fiber recovery filter increased.

The effect of the fractionation of the sweetener stock comes very apparent when, for example, mechanical pulps, TMP, SGW or PGW, having a high content of the fine material, very often over 30% and in some cases even are to be used as sweetener stock. The situation is the same also when secondary pulp is used as sweetener stock, which will in the future become more and more usual as the use of the secondary pulp increases.

According to one aspect of the invention, a method is practiced comprising the following steps: (a) Fractioning undiluted sweetener stock into fine and coarse fractions. (b) Mixing the sweetener stock coarse fraction, but not the fine fraction, with the white water. (c) Feeding the mixture of sweetener stock and white water to the recovery apparatus. (d) Recovering useable fibrous material from the mixture in the recovery apparatus. And (e) returning the recovered useable fibrous material to the paper machine.

The following advantages are achieved by utilizing the apparatus and practicing the method in accordance with the invention:

the capacity of the filter increases, so that a smaller filter is sufficient;

the filtrate clarity of the fiber recovery filter is improved, because the fine material of the sweetener stock no longer loads the filter;

more secondary pulps may be used as sweetener stock;

long-fibered softwood pulp may be replaced by mechanical pulps or recycled fibers with better yield;

fluctuation, for example, in the fiber recovery grade due to possible process fluctuations, may be controlled. For example, if the quality of the sweetener stock varies, it immediately affects the operation of the fiber recovery filter, but by fractionation of the sweetener stock, the quality thereof may be stabilized thus stabilizing the whole process.

It is also a fact that the solids content of the white water to be fed into the recovery when recovering the fibers varies, for example, according to the retention of the wire section in a paper machine. The maximum amount of solids in the white water when producing paper from pulp components containing a significant amount of fine material may be even 6000–8000 mg/l, i.e. 0.6–0.8% Naturally, the capacity of the fiber recovery filter and the filtrate clarity depend on the solids content of the white water to be fed to the fiber recovery. The lower the solids content of the white water is, the higher flow the fiber recovery filter must be able to treat and the clearer the filtrates are.

According to another preferred embodiment of the invention the white water entering the fiber recovery is led—prior to mixing with the sweetener stock—through a separation apparatus, separating fibrous material prior to the actual recovery filter into fine and coarse fractions, only the fine fraction of which is mixed with the sweetener stock.

The advantages gained by the invention include:
the capacity of the fiber recovery boiler increases, so that a smaller filter is sufficient;
the filtrate clarity of the fiber recovery filter is improved, in other words the solids content of the filtrates decreases;
the process fluctuations in a paper machine, eg. the fluctuation in the solids content of the white water due to the fluctuation in the retention, stabilize and do not affect the operation of the fiber recovery filter;
a sort of "middle water" is obtained, of which a portion of the fibers is removed and which may possibly be better used, for example, as a so called "carrier water"; and
the solids ratio between the sweetener stock and the white water may be raised optimal to the fiber recovery without the consistency of the mixture of the white water and the sweetener stock to be fed to the fiber recovery filter rising too high in view of the operation of the recovery (maximum approximately 1.0–1.2%).

DETAILED DESCRIPTION OF THE DRAWINGS

Figure 1:
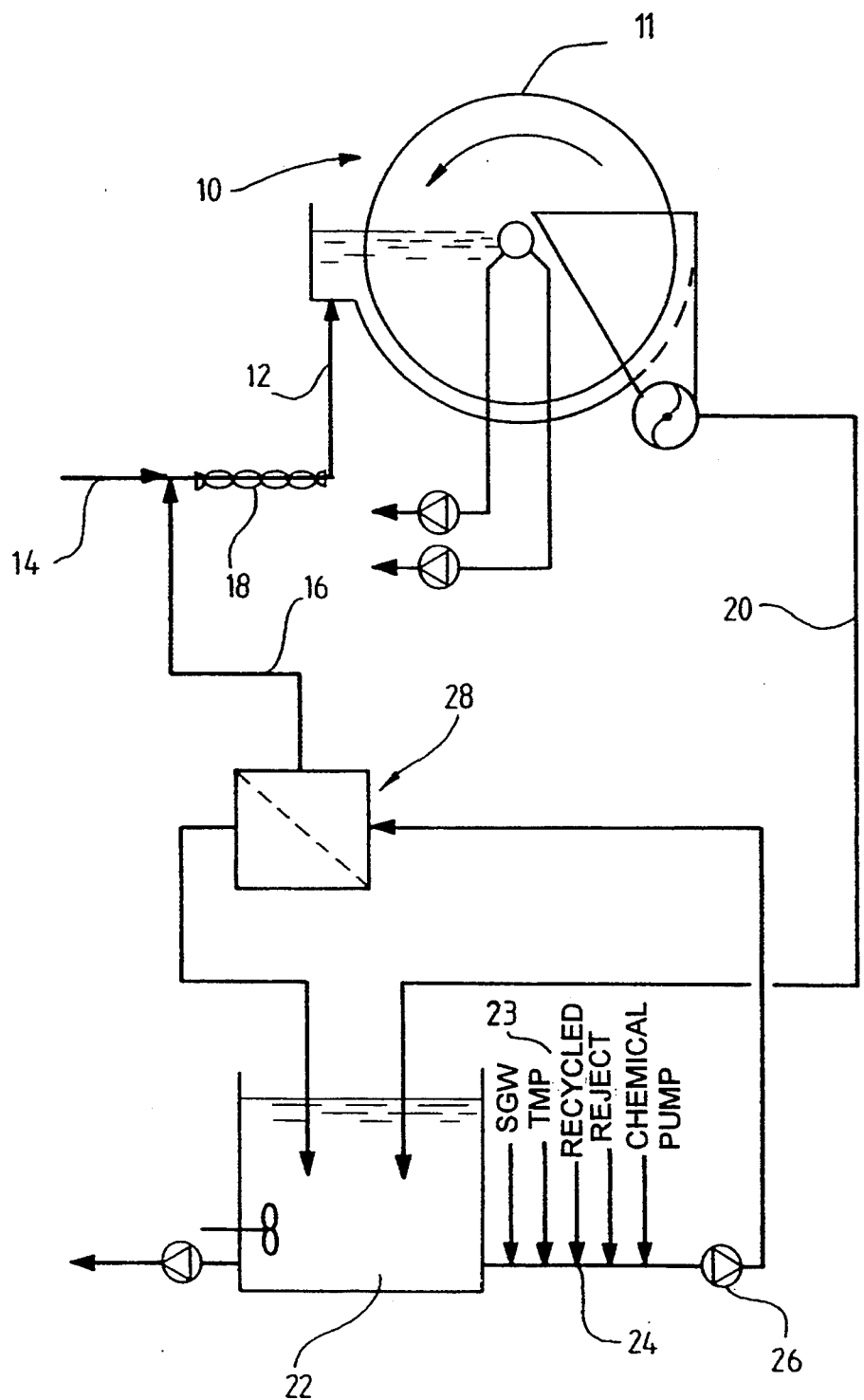
FIG. 1 is a schematic illustration of apparatus used in a fiber recovery process in accordance with a first exemplary embodiment of the present invention.

FIG. 1 illustrates apparatus for use in a fiber recovery process in accordance with a preferred embodiment of the present invention, visualizing as an example the treatment of the white water flowing from a paper machine. It is previously known to feed to a fiber recovery filter 10 a mixture of white water flowing along a pipe line 14 from a conduit 12, in other words the filtrate removed during web formation in the paper machine, and sweetener stock flowing along pipe line 16. A homogeneous mixing of white water and sweetener stock takes place in mixer 18. In theory, it is also possible to feed sweetener stock separately to the filter 10, allow a filtering layer to form on the filter surface 11, and only after that lead white water into contact with the filter surface 11. The result therefrom would, however, include the disadvantage of forming such a dense sweetener stock layer that the fraction separated thereby from the white water would accumulate on the surface thereof, which again would rapidly generate such a dense and homogeneous layer on the surface of sweetener stock layer that almost no filtration would take place through that layer and the capacity of the filter 10 would remain lower that in case a mixture of sweetener stock and white water were fed into the filter 10. Useable fibrous material recovered from the filter 10 is recycled along a pipe line 20 to a mixing vessel 22 in the paper machine.

It is typical of the method in accordance with the present invention that sweetener stock is supplied from the pipeline 24, through which different pulp components used in the manufacture of paper, such as SGW (stone ground wood), TMP, recycled pulp, reject or pulp, are introduced into the mixing vessel 22 in the paper machine through inlets 23. The sweetener stock is fed from the pipe line 24 by a pump 26 to a fractionation apparatus 28 for sweetener stock, in which the fine material and short fibers are separated from the inlet fiber suspension, so that only the long-fibered fraction "rejected" by the fractionation apparatus 28 is fed as sweetener stock into the white water. The pulp components are introduced into the pipe 24 usually in order, in other words so that the inlet conduit 23 for pulp best suited for sweetener stock is closest to the feed pump 26 for sweetener stock, the second best second, the third best third, and so forth. Thus the feed pump 26 for sweetener stock takes the required amount of the sweetener stock from the pipe 24 so that it is possible that it uses all the pulp to the sweetener stock and even a portion of the reject, or, if such is not in the "recipe" of the paper being manufactured, a portion of the recycled pulp.

It is also typical of the invention that the sweetener stock is pumped by the pump 26 at the original consistency thereof (i.e., undiluted) to the fractionation apparatus 28. Thus, apparatus 28 should be able to treat considerably thick pulp, because the consistency of the pulp is usually 3% or even slightly over 3%. The treatment of the undiluted sweetener stock is substantial, because the consistency of the pulp exiting the mixing vessel 22 must be approximately 3% (within a desired, relatively narrow, range). If dilution were used, it would be necessary, in order to maintain the water balance stable, either to feed the fraction accepted by the fractionation apparatus 28, whereby the whole fractionation would not be of much use, or to arrange the filtration of the accepted fraction prior to its being led to the mixing vessel 22.

A pressure screen, or a pressureless screen (e.g. a curved screen or a vortex cleaner), may operate as the fractionation apparatus 28. The sweetener stock obtained from the fractionation apparatus 28 comprises the "reject fraction" (i.e., when a screener is used the fraction which has not passed the filter surface, and when a cleaner is used the "heavy rejects"). The fractionation apparatus 28 may be dimensioned, or it may be run, for example, so that 50 to 80% of the solids to be fed to the fractionation apparatus 28 is used as sweetener stock and the rest is returned to mixing vessel 22.

Figure 2:
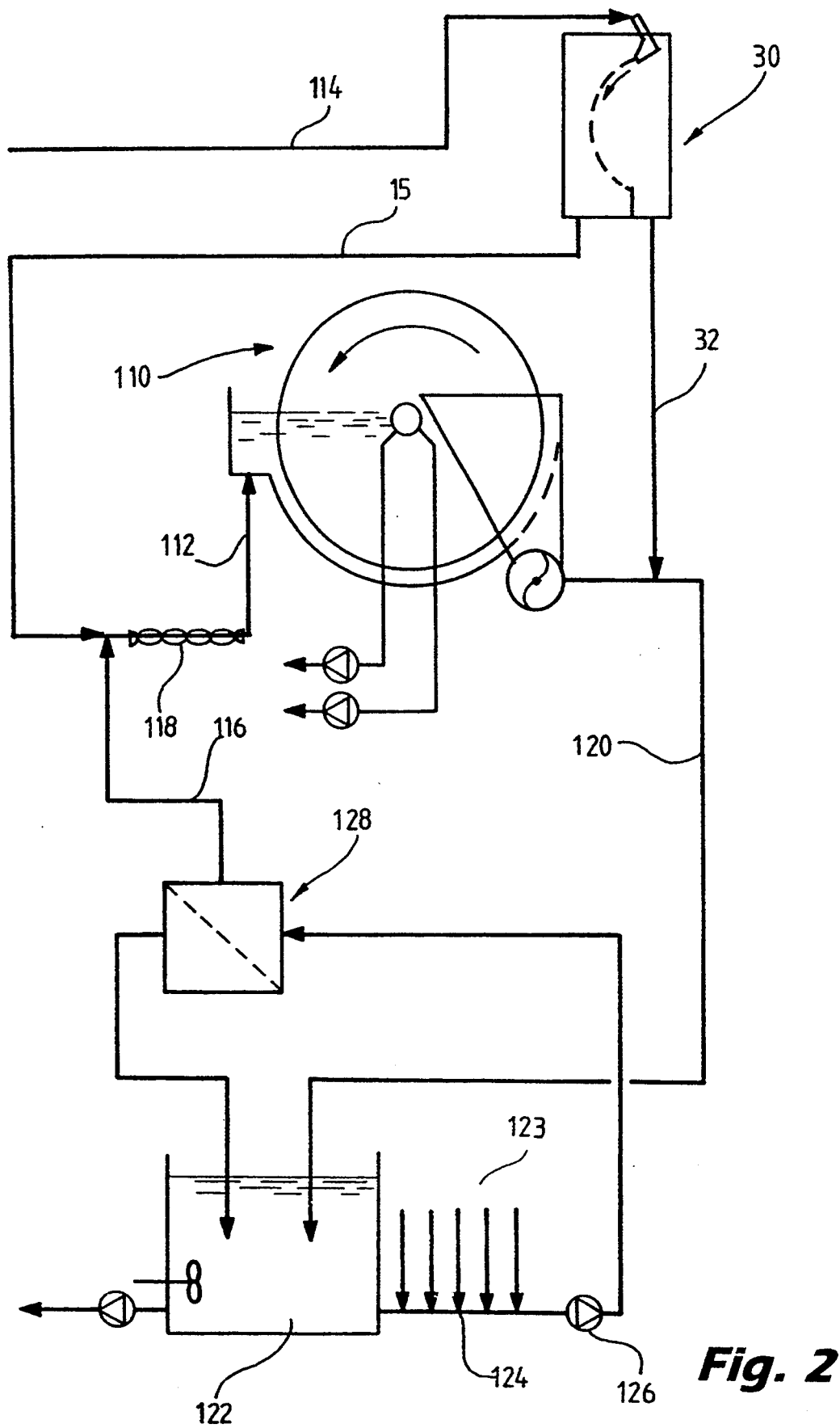
FIG. 2 is also a schematic illustration of apparatus used in a fiber recovery process in accordance with a second exemplary embodiment of the present invention.

FIG. 2 illustrates a flow diagram in accordance with a second embodiment of the present invention similar to that of FIG. 1, but provided with the treatment stage of the white water prior to mixing of the sweetener stock into the white water. Structures comparable to those in the FIG. 1 embodiment are illustrated by the same reference numeral only preceded by a "1".

In FIG. 2, the white water is introduced from the pipe line 14 into the treatment apparatus 30 for white water, in which a portion of the fibers in the white water are separated. The treatment apparatus 30 may be a pressureless screener (such as a curved screen), a filter, or a pressure screener. The operation of the apparatus 30 is based on a rapid separation process separating solids particles larger than a particular set size from the white water and thus stabilizing the quality of the white water and partially also the solids content thereof. According to FIG. 2, the coarser fraction separated by the treatment apparatus 30 is led along the flow passage 32 directly from the save-all filter 110 into the fibrous material in the pipe line 120 being discharged. The finer fraction separated in the treatment apparatus 30 is led along a pipe line 15 through the mixer 118 where it is mixed with the sweetener stock, to the fiber recovery filter 110.

It is appreciated from the above description that a new way of treating white water, eliminating the disadvantages of known procedures, has been developed so that fiber recovery from different white waters of the cellulose and paper industry is intensified and the size of the filters (e.g., 10, 110) used in the recovery, and thus also the investment costs, decrease. It must, however, be noted that although the above description includes only two embodiments of the present invention, they are merely given to exemplify the scope of the invention, not to restrict it in any way from what is said in the enclosed claims, which alone define the scope of the present invention. Thus it is apparent that the fractionation apparatus and the treatment apparatus may be any structures capable of achieving the above described results.

What is claimed is:

1. A method of treating white water from a paper machine, utilizing fiber recovery apparatus which uses sweetener stock, comprising the steps of:
   (a) fractioning undiluted sweetener stock into fine and coarse fractions;
   (b) mixing the sweetener stock coarse fraction, but not the fine fraction, with the white water;
   (c) feeding the mixture of sweetener stock and white water to the recovery apparatus;
   (d) recovering useable fibrous material from the mixture in the recovery apparatus; and
   (e) returning the recovered useable fibrous material to the paper machine.

2. A method as recited in claim 1 comprising the further step (f) of passing the fine fraction from step (a) to the paper machine.

3. A method as recited in claim 2 wherein step (a) is practiced with the sweetener stock at a consistency of at least about 3%.

4. A method as recited in claim 2 utilizing a mixing vessel associated with the paper machine; and wherein steps (e) and (f) are practiced by passing the recovered useable fibrous material and fine fraction to the mixing vessel.

5. A method as recited in claim 4 wherein step (a) is practiced by utilizing stock from the mixing vessel as the sweetener stock.

6. A method as recited in claim 1 utilizing a mixing vessel associated with the paper machine, and wherein step (e) is practiced by passing the useable fibrous material to the mixing vessel.

7. A method as recited in claim 6 wherein step (a) is practiced with the sweetener stock at a consistency of at least about 3%.

8. A method as recited in claim 1 comprising the further step (f) of separating the white water into fine and coarse fractions prior to the practice of step (b), and wherein only the fine fraction is used in the practice of step (b).

9. A method as recited in claim 8 comprising the further step of passing the coarse fraction from step (f) to the paper machine.

10. A method as recited in claim 9 utilizing a mixing vessel associated with the paper machine, and wherein step (e) is practiced by passing the useable fibrous material to the mixing vessel.

11. A method as recited in claim 10 wherein the coarse fraction from step (f) is passed to the mixing vessel.

12. A method as recited in claim 8 wherein step (a) is practiced with the sweetener stock at a consistency of at least about 3%.

13. A method as recited in claim 8 comprising the further step of passing the fine fraction from step (a) to the paper machine.

14. A method as recited in claim 8 utilizing a mixing vessel associated with the paper machine, and wherein step (e) is practiced by passing the useable fibrous material to the mixing vessel.

15. A method as recited in claim 14 wherein the coarse fraction from step (f) is passed to the mixing vessel.

16. A method as recited in claim 1 wherein step (a) is practiced with the sweetener stock at a consistency of at least about 3%.

17. A method as recited in claim 1 also utilizing a pump having an inlet; and comprising the further step of pumping sweetener stock for the practice of step (a), and supplying pulp most desirable for sweetener stock closest to the pulp inlet, and pulp least desirable for sweetener stock furthest from the pulp inlet.

* * * * *